United States Patent [19]
Jeong et al.

[11] Patent Number: 5,848,303
[45] Date of Patent: *Dec. 8, 1998

[54] CAMERA HAVING AN ENLARGED MARCO PHOTOGRAPHIC RANGE AND A CONTROL METHOD THEREFORE

[75] Inventors: Jong-kyo Jeong; Bon-jeong Goo, both of Kyeongsangnam-do, Rep. of Korea

[73] Assignee: Samsung Aerospace Industries, Inc., Kyeongsangnam-do, Rep. of Korea

[*] Notice: The term of this patent shall not extend beyond the expiration date of Pat. No. 5,467,162.

[21] Appl. No.: 826,080

[22] Filed: Mar. 24, 1997

Related U.S. Application Data

[63] Continuation of Ser. No. 251,519, May 31, 1994, abandoned.

[30] Foreign Application Priority Data

Jun. 11, 1993 [KR] Rep. of Korea ................. 1993-10661

[51] Int. Cl.⁶ ............................. G03B 3/00; G03B 13/18
[52] U.S. Cl. .......................... 396/65; 396/266; 396/80; 396/61
[58] Field of Search ................................. 359/693, 705; 396/836, 837, 91, 61, 65, 67, 79, 80–83, 266, 263

[56] References Cited

U.S. PATENT DOCUMENTS

| | | | |
|---|---|---|---|
| 4,459,005 | 7/1984 | Harvey | 354/403 |
| 4,727,389 | 2/1988 | Raschke | 354/402 |
| 4,764,784 | 8/1988 | Torikoshi et al. | 354/195.12 |
| 5,017,955 | 5/1991 | Kotani | 396/61 |
| 5,047,792 | 9/1991 | Asano et al. | 354/149.11 |
| 5,162,837 | 11/1992 | Katsuki | 354/416 |
| 5,448,331 | 9/1995 | Hamada et al. | 354/403 |
| 5,467,162 | 11/1995 | Goo | 354/402 |

*Primary Examiner*—Russell Adams
*Assistant Examiner*—Michael Dalakis
*Attorney, Agent, or Firm*—McAulay Nissen Goldber Kiel & Hand, LLP

[57] ABSTRACT

The camera has an enlarged macro photographic range and the control method for the camera controls the diaphragm, enlarges the photographic range and takes the photograph of the object a the flash, so that a photograph having a suitable exposure can be obtained. The camera includes a switch block, a motor driving circuit, a micro controller, an automatic distance measuring circuit, a brightness measuring circuit and a strobo.

2 Claims, 3 Drawing Sheets

CAMERA HAVING AN ENLARGED MARCO PHOTOGRAPHIC RANGE AND A CONTROL METHOD THEREFORE

This is a continuation of application Ser. No. 08/251,519 filed on May 31, 1994, now abandoned.

BACKGROUND OF THE INVENTION

A. Field of the Invention

The present invention relates to a camera having an enlarged macro photographic range and control method therefor. More particularly, this invention relates to a camera having an enlarged macro photographic range and a control method therefor which controls a diaphragm, enlarges a photographic range and takes a photograph of an object with a flash, so that a photograph having a suitable exposure can be obtained.

B. Description of the Related Art

Conventionally, when a focus is made on an object at the time of photographing, the objects around the focal length are unclear. However, if the objects around the focal length are within a permissible range, these objects appear to be focused visually. Generally, the permissible range around the object in which other objects appear to be focused is called as a depth of field.

The possible photographic range is enlarged when the shorter the focal length of a lens, the longer a photographic distance and the smaller an aperture of a diaphragm, the deeper the depth of field. The possible photographic range narrows when the longer the focal length of a lens, the shorter the photographic distance and the larger the aperture of the diaphragm, the shallower the depth of field.

In a general zoom camera, a minimum photographic distance in accordance with the focal length in accordance with optical data is determined by a required resolution since the distance measuring ability and a forward and a reverse mechanical movement of the lens are limited.

Namely, in the conventional zoom camera having a focal length of 38 mm to 115 mm, for example, when the focal length is 33 mm, the minimum photographic distance is set about 0.79 m in accordance with the required resolution, and the shutter is locked so that a photograph cannot be taken when the photographic distance is less than 0.79 m.

Accordingly, the conventional zoom camera has a disadvantage in that a user cannot obtain a transient image in a near distance and a desired photograph since the minimum photographic distance corresponding to the focal length is limited to satisfy the required resolution. Thus, the shutter is locked and the photographic operation is suspended when the user attempts to take a photograph of an object at a distance less than the minimum photographic distance. That is, a close-up photograph cannot be obtained.

In addition, the conventional zoom camera has the disadvantage that the user cannot obtain the desired photograph since the photograph is blurred around the object in case of a macro photograph.

SUMMARY OF THE INVENTION

Accordingly, the prevent invention is directed to a camera which substantially obviates one or more of the problems due to limitations and disadvantages of the related art. The present invention is directed to a camera and a camera operating method capable of enlarging a photographic range and obtaining a photograph having a suitable exposure in case of a macro photographic operation by supplementing an insufficient amount of flash illumination due to narrowing of an aperture of a diaphragm, by deepening a depth of field, flashing a flash artificially, and narrowing the aperture of the diaphragm.

In accordance with the invention, the camera has an enlarged macro photographic and includes a switch block including a power switch for producing a function selection of a user to an electric signal, a first step release switch, a second step release switch and a photographic switch. The camera also has first means for producing a signal for driving a motor to carry out a zooming operation if the power switch is operated and a lens cap is opened.

The camera also has a micro controller for producing a signal for measuring the distance from an object if the first release switch is operated after the power switch in the switch block is operated and the state of a camera is initialized, determining a relation between a possible photographic top value and an AF zone changed in accordance with a measured value inputted after producing a brightness measuring signal, locking a release operation when a photograph is not possible because the measured value is greater than the possible photographic top value, determining whether a present position of a lens barrel is an extreme telephoto photographic position in case of a macro photographic position after determining whether the present position of the lens barrel is the macro photographic position when the photograph is possible because the measured value is less than the possible photographic top value, carrying out the macro photographic process when a present focal length is greater than an established value after determining a relation between the present focal length and an established value of the focal length established to determine the macro photographic process or a strobo (i.e. electronic flash) photographic process when the present position of the lens barrel is not the macro photographic position, determining the position of the AF zone if the calculated AF zone value is less than a first established value after determining the relation between the AF zone value, enlarging a photographic range by defining an F number in accordance with the measured value when the AF zone value is greater than the first established value, calculating a guide number which decides brightness of the strobo to supplement the amount of illumination by a defined F number, and carrying out the photographic operation by producing a signal for flashing the strobo after said second step release switch is operated.

The camera has second means for receiving a signal from the micro controller after the first step release switch in the switch block is operated, measuring the distance from the object and producing a signal corresponding to the measured value.

A third means is also provided for receiving a signal from the micro controller, measuring an ambient brightness around the object and producing a signal corresponding to the measured brightness.

The camera has strobo means i.e. flash means for receiving a signal from the micro controller and emitting a suitable amount of illumination to obtain a photograph having a suitable exposure when the brightness measured by the third means is insufficient, or the exposure in accordance with the F number is insufficient.

In another variation, a control method for a camera having an enlarged macro photographic range comprises the steps of establishing a photographic mode in accordance with an input of the suitable photographic mode after opening a lens cap if power is applied to the camera and a power switch is turned ON; measuring a distance from an object and measuring ambient brightness around the object if a first step release switch is operated; determining whether an AF zone converted in accordance with the measured distance is greater than a possible photographic top value, suspending the operation of a shutter when a photograph is impossible because the measured distance is greater than the possible photographic top value, and determining whether a present position of a lens barrel is a macro photographic position when the photograph is possible because the measured distance is less than the possible photographic top value.

The method also includes the steps of determining again whether the position of the lens barrel is an extreme telephoto photographic position in case of the macro photographic position, carrying out the extreme telephoto photographic process in case of the extreme telephoto photographic position, and determining a relation between a present focal length and an established value which is a focal length established to determine the macro photographic process or a strobo photographic process when the present position of the lens barrel is not the macro photographic position.

The method also includes the steps of determining the relation between the AF zone in the measured distance and a first established value which is a reference value for the flash of the strobo means when the present focal length is less than the established value so that the photographic mode is not converted to the macro photographic mode; determining the relation between the AF zone in the measured distance and a second established value which is the reference value for the macro photographic process when the present focal length is equal to or greater than the established values so that the macro photographic operation is carried out; and carrying out the macro photographic process when the photograph is possible without flashing the strobo means because the present focal length is greater than the second established value.

The method also includes the steps of enlarging a photographic range when the photograph is possible with the flash of the strobo means because the AF zone in the measured distance is greater than the first established value, and carrying out a corresponding AF step process when the photograph is possible because the AF zone in the measured distance is less than the first established value; and taking the photograph of the object by flashing the strobo means if the second release switch is operated after the above-mentioned operation, and ending.

The accompanying drawings are included to provide a further understanding of the invention and are incorporated in and constitute a part of this specification, illustrate one embodiment of the invention and together with the description, serve to explain the principles of the invention.

DETAILED DESCRIPTION OF THE PREFERRED EMBODIMENT

Figure 1:
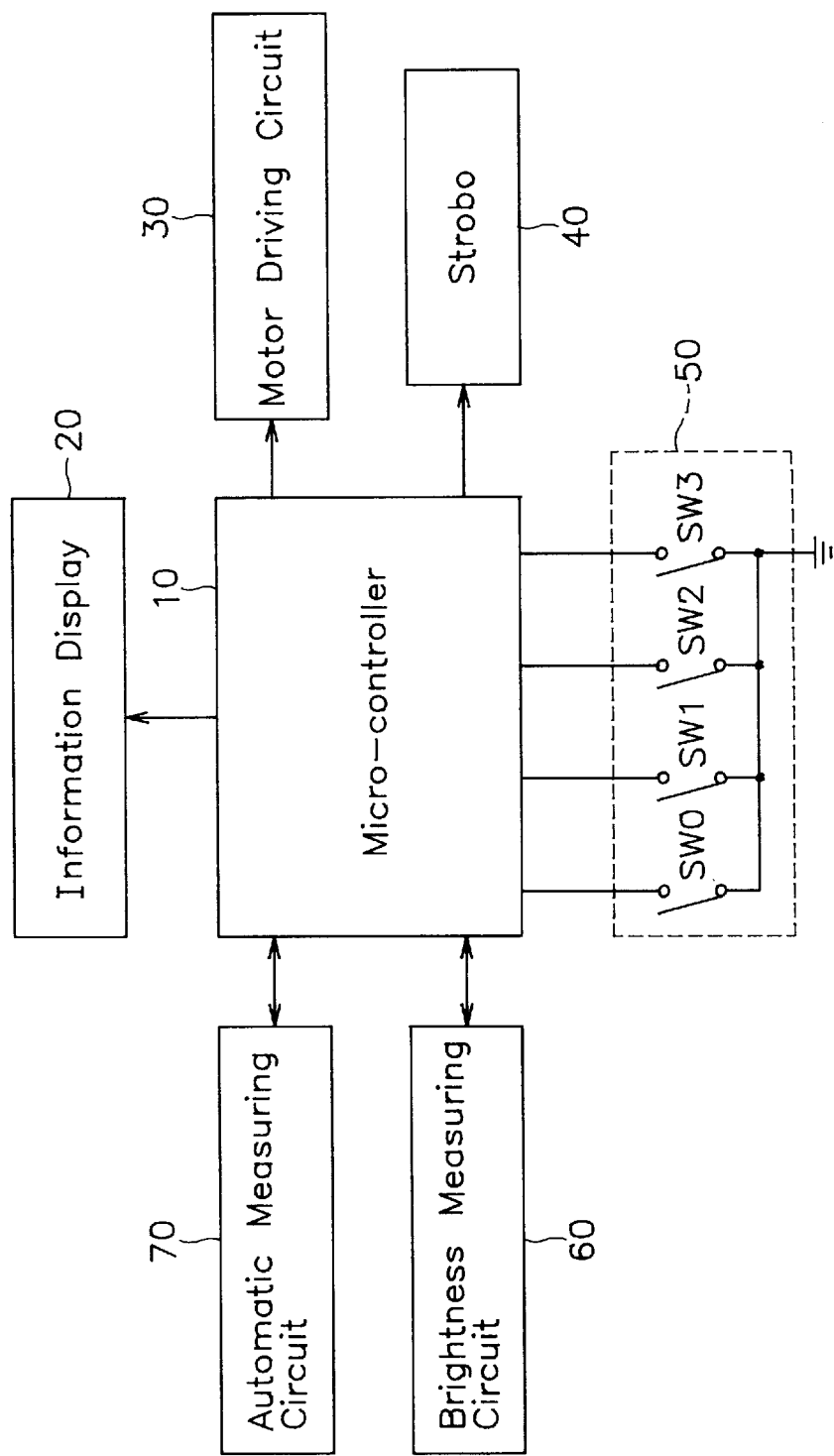
FIG. 1 is a block diagram illustrating one embodiment of the prevent invention.

Referring to FIG. 1, a camera having an enlarged macro photographic range comprises a micro controller 10, an information display 20 connected to an output terminal of the micro controller 10, a motor driving circuit 30, a strobo 40, a switch block 50 connected to an input terminal of the micro controller 10, a brightness measuring circuit 60 connected to the input and output terminals of the micro controller 10, and an automatic distance measuring circuit 70.

Figure 2A:
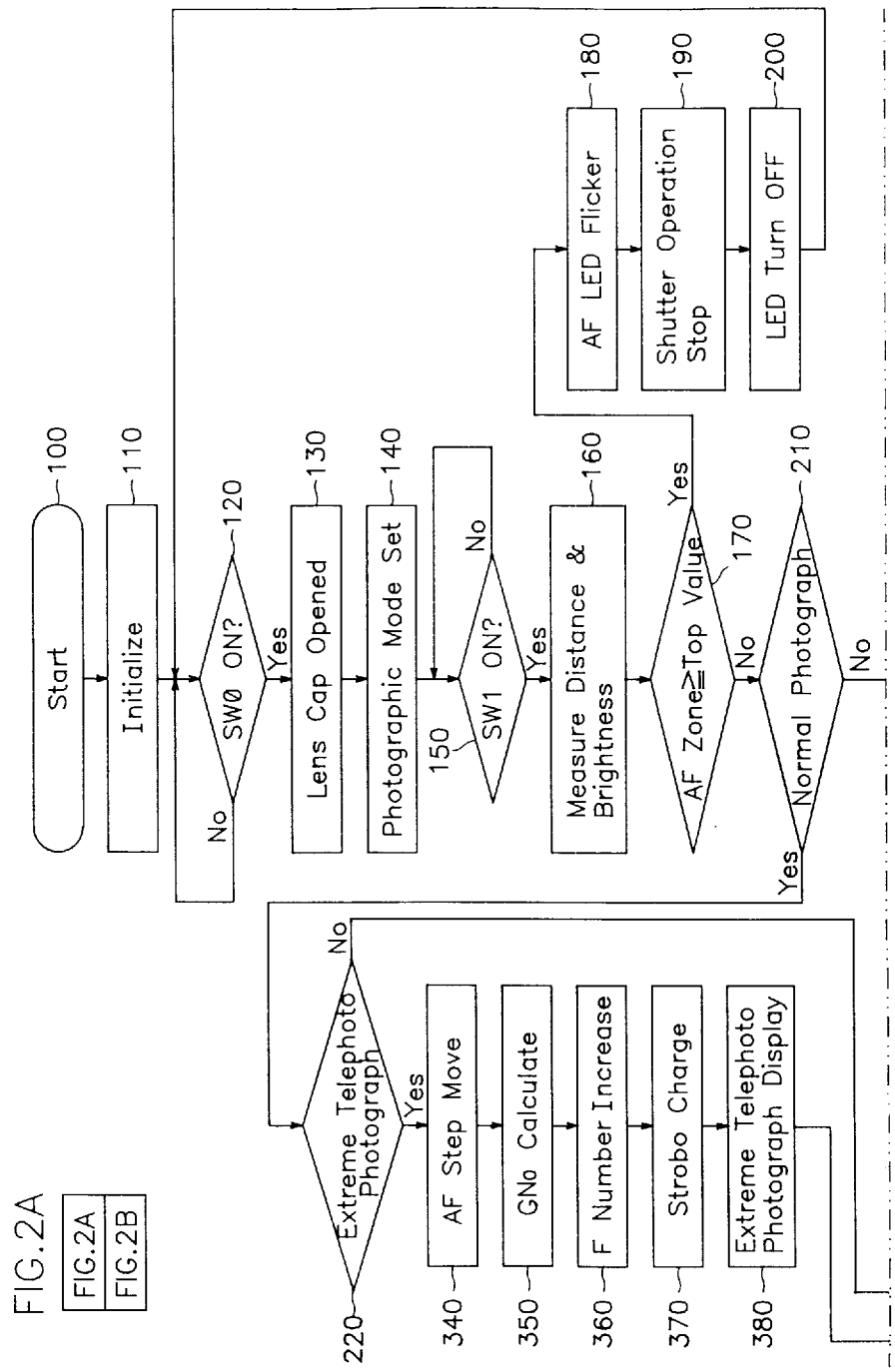
FIG. 2A and 2B are flow charts showing the operational steps preferred by the disclosed embodiment of the prevent invention.
Figure 2B:
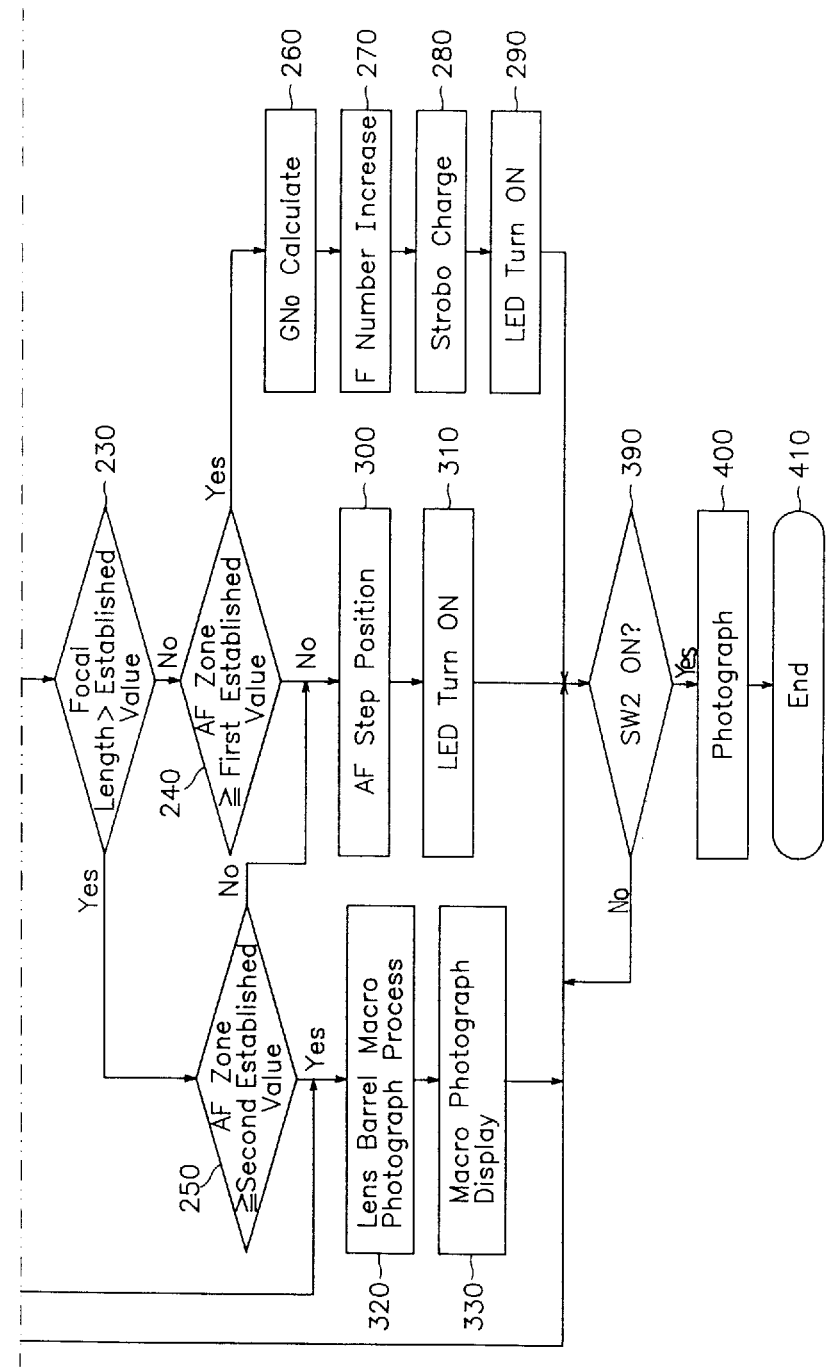

Referring to FIGS. 2A and 2B, the operation of the camera having an enlarged macro photographic range in accordance with one preferred embodiment will now be described.

If power is applied to the camera (Step 100), the micro controller 10 initializes an internal circuit in a camera (Step 110) and determines whether a power switch SW0 is operated (Step 120). If the power switch SW0 is turned ON, the micro controller 10 drives the motor driving circuit 30.

The motor driving circuit 30 operates and produces a signal for driving a motor (not shown). The motor is then operated forward, a lens cap is removed and the camera is placed in a stand by mode ready to do a next operation (Step 130).

Next, the micro controller 10 establishes a photographic mode in accordance with a selection of a user, and transfers information about the selected photographic mode to the information display 20. Accordingly, the information display 20 informs the user of the established photographic mode (Step 140).

If a first release switch SW1 is turned ON after the micro controller 10 determines whether the first step release switch SW1 is operated in the stand by mode, the micro controller 10 drives the automatic distance measuring circuit 70 to measure the distance from the object and drives the brightness measuring circuit 60 to measure the ambient brightness circuit around the object, and calculates the amount of exposure at that time (Step 160).

Generally, a relation among the distance from the object L, light amount GNo of a strobo and brightness of a lens, namely, F number FNo is as follows;

$$GNo = FNo \times L \quad \text{- - -} \tag{1}$$

The micro controller 10 converts the measured distance into an automatic focus zone divided by several ranges after measuring the distance from the object, and determines a relation between the automatic focus AF zone where a photograph is possible in accordance with a required resolution (Step 170) in accordance with the measured distance and a top value.

Since a photograph is impossible due to an insufficient resolution when the AF zone of the measured distance is greater than the top value, the micro controller 10 locks a shutter so that a photographic operation is not carried out (Step 190) after the micro controller 10 flickers an automatic focus light emitting diode AF LED in the information display 20 to indicate that the automatic focus operation can not carried out (Step 180). The micro controller 10 turns OFF the AF LED in the information display 20 after blocking the operation of the shutter (Step 200).

The micro controller 10 determines whether a present position of a lens barrel in accordance with the selected photographic mode is a macro photographic position when the photograph is possible when the AF zone of the measured distance is less than the top value (Step 210). The micro controller 10 again determines whether the present position of the lens barrel is an extreme telephoto photographic position when the position of the lens barrel is the macro photographic position (Step 220), and determines a relation between a focal length in accordance with the present position of the lens barrel and an established value, namely, a focal length established for determining a strobo photographic process (Step 230). The established value is 100 mm by which the macro photographic operation in accordance with the embodiment of the present invention is carried out.

The micro controller 10 determines a relation between the AF zone of the measured distance and a focal length, namely, a first established value which is a reference value for determining the strobo photographic process when the macro photographic operation is not carried out since the present focal length is less than the established value (Step 240), and determines a relation between the AF zone of the measured distance and the a second established value which is the reference value for the macro photographic process without flashing the strobo when the macro photographic operation is carried out since the present focal length is greater than the established value (Step 250).

The micro controller 10 calculates the brightness GNo of the strobo when the photograph is possible with the flashing of the strobo since the focal length is less than the established value and the AF zone of the measured distance is greater than the first established value in the above (Step 260).

The micro controller 10 reduces an aperture of a diaphragm (not shown) and enlarges the possible macro photographic range to take a photograph of the object in a close range even though the present position of the lens barrel is not the macro photographic position after determining the brightness GNo of the strobo 40 (Step 270). Then, the micro controller 10 transfers a charge signal to the strobo 40 (Step 280) and starts to charge the strobo 40 to obtain a photograph having a suitable exposure (Step 280).

The micro controller 10 then turns ON a light emitting diode LED in the information display 20 to indicate that the strobo 40 is being charged (Step 290).

The above-mentioned operation may be carried out when the AF zone of the measured distance is less than the first established value, a zone where a photograph having a suitable exposure can be obtained with flashing of the strobo.

The micro controller 10 moves the lens barrel to the established AF step position (Step 300) when the focal length is less than the established value, 100 mm, and the AF zone of the measured distance is less than the first established value in the above, and indicates through the information display 20 that the automatic focusing is finished (Step 310).

The micro controller 10 determines a relation between the AF zone of the measured distance and the second established value when the present focal length is greater than the established value, drives the motor driving circuit 30, and moves a zoom motor (not shown) to the macro photographic position when the photographing should be carried out since the AF zone of the measured distance is greater than the second established value (Step 320). The micro controller 10 informs the user that the present photographic mode is the macro photographic mode through the information display 20 after moving the lens barrel to the macro photographic position (Step 330).

The second established value is a zone in the above. The micro controller 10 moves the lens barrel to the established AF step position, and displays through the information display 20 the automatic focusing is finished when the present photographic mode is not the macro photographic position since the position of the lens barrel is greater than the position of the established position and the AF zone of the measured distance is less than the second established value (Step 310). The micro controller 10 determines whether the present photographic position of the lens barrel is the extreme telephoto photographic position when the photograph is possible and the position of the lens barrel is the macro photographic position since the AF zone of the measured distance is less than the top value (Step 220). Then, the micro controller 10 drives the zoom motor (not shown) by driving the motor driving circuit 30, moves the lens barrel to the extreme telephoto photographic step (Step 340) when the position of the lens barrel is the extreme telephoto photographic position, and calculates the brightness (GNo) of the strobo (Step 350).

After the micro controller 10 calculates the brightness (GNo) of the strobo 40 in accordance with an optical data, the micro controller 10 enlarges the macro photographic range (Step 360) by reducing the F number to a minimum in accordance with the decided brightness (GNo) of the strobo 40, starts to charge the strobo 40 (Step 370), and displays through the information display 20 that the strobo 40 is being charged (Step 380).

The micro controller 10 determines whether the second step release switch SW2 in the switch block 50 is operated (Step 390) after carrying out the above-mentioned operation, carries out the photographic operation (Step 400) by flashing the strobo if the second release step release switch SW2 is turned ON, and ends (Step 410).

As shown in table 1, the possible minimum macro photographic range is enlarged by reducing the aperture of the diaphragm and taking the photograph of the object with the flashing of the strobo in case of the macro photographic range.

(TABLE 1)

| Focal Length (mm) | Related Art RL Distance | RL Distance When Strobe ON |
|---|---|---|
| 38 | less than 0.748 m | less than 0.596 m |
| 45 | less than 0.849 m | less than 0.596 m |
| 60 | less than 0.955 m | less than 0.731 m |
| 65 | less than 1.003 m | less than 0.795 m |
| 75 | less than 1.037 m | less than 0.849 m |
| 80 | less than 1.075 m | less than 0.899 m |
| 85 | less than 1.116 m | less than 1.075 m |
| 90 | less than 1.138 m | less than 1.095 m |
| 100 | less than 1.208 m | less than 0.652 m |
| 105 | less than 1.233 m | less than 0.652 m |
| 115 | less than 1.258 m | less than 0.652 m |
| macro | less than 0.692 m | less than 0.652 m | where RL is release lock.

Since the possible minimum macro photographic range is 0.596 m by reducing the F number and flashing the strobo in accordance with the embodiment of the present invention, it is possible to photograph the object at a closer distance (i.e. at about 0.6 m) than compared with that the possible minimum macro photographic distance is 0.748 m in the conventional position of the lens barrel (35 mm) without the flashing of the strobo as shown in Table 1.

The invention thus provides a camera having an enlarged macro photographic range and a control method therefor which controls the diaphragm most suitably, enlarges the photographic range and takes the photograph of an object with a flash, so that the photograph having the desired exposure can be obtained.

What is claimed is:

1. A zoom camera having a predetermined shortest shooting distance for auto-focusing and a predetermined minimum distance for a flash mode comprising a first release switch;

first means responsive to actuation of said first release switch for measuring a distance from an object;

a second release switch;

flash means for emitting light in response to actuation of said second release switch; and a micro-controller including second means for comparing the measured distance from said first means with a predetermined shortest shooting distance; and third means for comparing the measured distance from said first means with a predetermined minimum distance when the measured distance is shorter than said predetermined shortest shooting distance, the predetermined minimum distance being shorter than the predetermined shortest shooting distance;

wherein said micro-controller locks operation of said second release switch when the measured distance is shorter than the predetermined minimum distance, and said micro-controller narrows an iris diaphragm and activates said flash means when the measured distance is equal to or longer than the predetermined minimum distance and the measured distance is shorter than the predetermined shortest shooting distance.

2. A method for shooting close to an object with a zoom camera having a first release switch, a second release switch, an iris diaphragm and a flash means, comprising the steps of:

measuring a distance from the object when the first release switch is operated;

comparing the measured distance with a predetermined shortest shooting distance;

comparing the measured distance with a predetermined minimum distance when the measured distance is shorter than said predetermined shortest shooting distance, the predetermined minimum distance being shorter than the predetermined shortest shooting distance;

locking operation of the second release switch when the measured distance is shorter than the predetermined minimum distance; and narrowing the iris diaphragm and activating the flash means when the measured distance is equal to or longer than the predetermined minimum distance and the measured distance is shorter than the predetermined shortest shooting distance.

* * * * *